2,948,726
Patented Aug. 9, 1960

2,948,726

NEW PHENAZINE DERIVATIVES

Vincent C. Barry, Rathgar, Dublin, James G. Belton, Terenure, Dublin, James G. Conalty, Dublin, Dermot Twomey, Terenure, Dublin, and John F. O'Sullivan, Ranelagh, Dublin, Ireland, and Ernst Hodel, Basel, Switzerland, assignors to Geigy Chemical Corporation, New York, N.Y., a corporation of Delaware No Drawing. Filed Apr. 25, 1957, Ser. No. 654,983

Claims priority, application Switzerland Apr. 27, 1956

4 Claims. (Cl. 260—267)

The present invention concerns new phenazine derivatives which have valuable chemotherapeutic, in particular, tuberculostatic properties, as well as processes for the production of these compounds.

It is known that by oxidising N-phenyl-o-phenylendiamine hydrochloride with ferric chloride, 2-anilino-3-imino-5-phenyl-3.5-dihydro-phenazine (anilino-aposafranine) is obtained which has tuberculostatic activity, see Nature 162, 622–623 (1948).

Surprisingly it has now been found that 2-amino-3-imino-3.5-dihydro-phenazines having three nitrogen atom substituents and which correspond to the general formula:

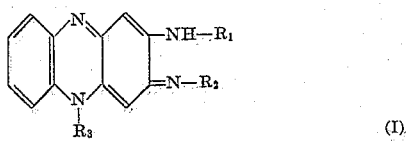

wherein two of the three symbols $R_1$, $R_2$ and $R_3$ represent phenyl radicals or the same halogenphenyl, alkylphenyl or alkoxyphenyl radicals, and the third symbol represents an alkyl or cycloalkyl radical as hereinafter disclosed, have a considerably more strong tuberculostatic activity than the phenazine derivatives which have been previously described. In addition, in pharmacological trials they differ from the known tuberculostatics in that e.g. they keep mice infected with tubercle bacilli alive long after the completion of the treatment.

Compounds according to the above general formula can be produced in a simple manner from 2-arylamino-3-imino-5-aryl-3.5-dihydro-phenazines or from the isomeric 2-amino-3-arylimino-5-aryl-3.5-dihydro-phenazines by heating a salt, in particular the hydrochloride of such a compound corresponding to one of the two formulae:

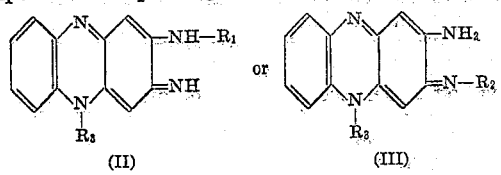

with a corresponding alkylamine or with a cycloalkylamine.

Starting materials of the general Formula II having substituted aryl radicals Ar can be obtained analogously to the known anilino-aposafranine by oxidising N-aryl-o-phenylendiamines, in which the phenyl radical having no primary amino group is substituted by chlorine, bromine or low molecular alkyl or alkoxy groups, with ferric chloride. Apart from the above named compound, examples of suitable starting materials are 2-(o-chloranilino)-3-imino-5-(o'-chloro-phenyl)-3.5-dihydro-phenazine, 2-(p-chlor-anilino)-3-imino-5-(p'-chloro-phenyl)-3.5-dihydro-phenazine, 2-(p-brom-anilino)-3-imino-5-(p'-bromo-phenyl)-3.5-dihydro-phenazine, 2-(o-toluidino)-3-imino-5-(o'-tolyl)-3.5-dihydro-phenazine, 2-(p-toluidino)-3-imino-5-(p'-tolyl)-3.5-dihydro-phenazine, 2-(p-ethyl-anilino)-3-imino-5-(p'-ethyl-phenyl) - 3.5 - dihydrophenazine, 2-(o-anisidino)-3-imino-5-(o'-anisyl)-3.5-dihydro-phenazine, 2-(p-anisidino)-3-imino-5-(p'-anisyl)-3.5-dihydro-phenazine, 2-(p-phenetidino)-3-imino-5-(p'-phenetyl)-3.5-dihydro-phenazine, 2-(p-n-propoxy-anilino)-3-imino-5-(p'-n-propoxy-phenyl) - 3.5 - dihydrophenazine and 2-(p-isopropoxy-phenyl)-3-imino-5-(p'-isopropoxy-phenyl)-3.5-dihydro-phenazine.

Isomeric starting materials of the general Formula III are obtained if salts of 2-amino-diphenylamine or 2-amino-diphenyl-amines the phenyl radical of which having no primary amino group is substituted by chlorine, bromine or low molecular alkyl or alkoxy groups, are oxidised with benzoquinone instead of with ferric chloride. Examples of starting materials of the general Formula III are 2-amino-3-phenylimino-5-phenyl-3.5-dihydro-phenazine; 2-amino-3-(p-tolylimino)-5-(p'-tolyl)-3.5-dihydro-phenazine; 2-amino-3-(o-anisylimino)-5-(o'-anisyl)-3.5-dihydro-phenazine; 2-amino-3-(p-anisylimino)-5-(p'-anisyl-3.5-dihydro-phenazine; 2-amino-3-(p-phenetylimino-5-(p' - phenetyl)-3.5-dihydro-phenazine; 2-amino-3-(p-isopropoxy - phenylimino) - 5 - (p' - isopropoxy - phenyl)-3.5-dihydro-phenazine and 2-amino-3-(p-chloro-phenylimino)-5-(p'-chloro-phenyl)-3.5-dihydro-phenazine. In the form of their salts, in particular hydrochlorides, these compounds of the general Formula II or III can be reacted with e.g. ethylamine, n-propylamine, isopropylamine, n-butylamine, isobutylamine, sec. butylamine, n-amylamine, diethyl-methylamine, n-hexylamine, α.γ-dimethyl-butylamine, n-heptylamine, n-decylamine, n-dodecylamine, cyclohexylamine or cycloheptylamine.

End products of the general Formula I can also be obtained starting from compounds of the Formulae II and III by reacting advantageously in the presence of an acid binding agent such as, e.g. an alkali hydroxide, a compound of the general Formula II or III with an alkylating agent or cycloalkylating agent, in particular with dimethyl sulphate, diethyl sulphate or an alkyl or cycloalkyl halide.

In addition compounds of the general Formula I in which $R_2$ represents an alkyl or cycloalkyl radical bound to the imino group by way of a CH— group, i.e. a secondary alkyl or cycloalkyl radical, can also be produced by oxidising a salt of an N-aryl-o-phenylendiamine of the formula:

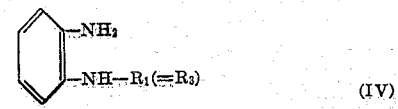

wherein $R_1$ (=$R_3$) has the meaning given above, with p-benzoquinone or with an alkali iodate in the presence of an alkanone or cycloalkanone, to form 2.5-dihydro-imidazolo[4.5-b]phenazine of the formula:

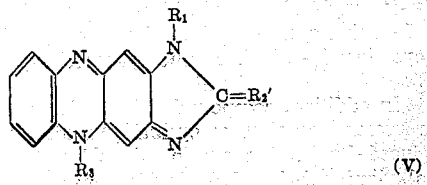

wherein $R_2'$ represents an alkylidene or cycloalkylidene radical, treating the latter compound with catalytically activated hydrogen until at least 2 mol of hydrogen have been taken up and then treating it with an oxidising agent, in particular a gas containing oxygen, e.g. air. The hydrochlorides for example can be used as salts of N-aryl-o-phenylendiamines and the oxidation with p-benzoquinone or an alkali iodate is performed in the presence of ketones, advantageously at moderately raised temperatures of 40–70°. Examples of suitable substituted N-arylo-phenylendiamines are N-(4-chloro-phenyl)-, N-(4-methyl-phenyl)- and N-(4-isopropoxy-phenyl)-o-phenylendiamines which can be oxidised for example in the presence of ketones such as acetone, butanone, diethyl ketone, isobutyl-methyl ketone, cyclohexanone, 4-methyl cyclohexanone or cycloheptanone.

Depending on the solubility of the ketone to be reacted, water or aqueous alcohol can be used as solvent. The dark coloured crude product obtained on the oxidation is first purified advantageously by extraction with benzene, possibly passing through an aluminium oxide column, concentration and precipitation of a previously purified product with petroleum ether. Further recrystallisation can be made, e.g. from ligroin. Only recrystallised dihydro-imidazolo-phenazines are suitable for the subsequent hydrogenation. As catalyst here, in particular, platinum oxide according to Adams is used, e.g. in ethanol as solvent, at room temperature and atmospheric hydrogen pressure.

Also, a 2-arylamino-3-imino-5-aryl-3.5-dihydro-phenazine of the Formula II can be condensed with an alkanone or cycloalkanone in the presence of mono- or poly-phosphoric acid to form a dihydro-imidazolo-phenazine of the Formula V and this can be converted as described above into a compound of the Formula I having a secondary alkyl or cycloalkyl radical $R_2$.

Compounds of Formula I in which $R_3$ represents an alkyl or cycloalkyl radical and therefore $R_1$ and $R_2$ represent aryl radicals, are obtained by condensing a 2-hydroxy-5-arylamino-1.4-benzoquinone 4-arylimine or a 4.5-diarylamino-1.2-benzoquinone which is a tautomer thereof, corresponding to the two formulae:

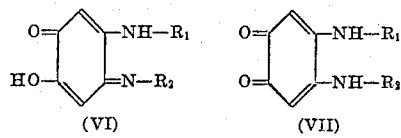

respectively wherein $R_1$ and $R_2$ represent the same aryl radicals, as defined in Formula I, with a mineral acid salt of an N-alkyl- or N-cycloalkyl-o-phenylendiamine. The condensation can be performed by heating the reaction components together at moderately high temperatures, e.g. by boiling in alcohol. The starting materials of the Formulae VI and VII necessary for this process are obtainable for example by condensing oxidation of a mixture of brenzcatechin and aniline, a halogen aniline, alkylaniline or alkoxyaniline in molecular ratio of 1:2 by means of silver oxide or lead dioxide. Examples of arylamine suitable for the reaction with brenzcatechin are aniline o- m- and p-toluidine, p-ethylaniline, p-tert. butyl aniline, o-, m- and p-anisidine, p-phenetidine, p-isopropoxy aniline, o-chloraniline, m-chloraniline, p-chloraniline, m-fluoraniline, p-fluoraniline and p-bromaniline. The intermediate products of the formulae VI or VII obtained therefrom can be reacted, e.g. with N-methyl-, N-ethyl-, N-n-propyl-, N-isopropyl-, N-n-butyl-, N-isobutyl-, N-isoamyl-, N-n-hexyl-, N-n-dodecyl- N-cyclopentyl-, N-(2-methyl-cyclopentyl)-, N-cyclohexyl, N-(4-methyl-cyclohexyl)-, N-(3.5-dimethyl-cyclohexyl)- or N-cycloheptyl-o-phenylendiamine.

In addition, compounds of the Formula I wherein $R_3$ represents an alkyl or cycloalkyl radical can also be produced by heating a mineral acid salt of a 2-amino-3-alkylimino-5-alkyl-3.5-dihydrophenazine or 2-amino-3-cycloalkylimino-5-cycloalkyl-3.5-dihydrophenazine with at least two mols of aniline, halogen aniline, alkyl aniline or alkoxy aniline. The phenazine derivatives in which the two alkyl or cycloalkyl radicals are the same which are necessary here as starting materials are obtained e.g. by oxidative condensation of N-alkyl- or N-cycloalkyl-o-phenylendiamines by treating solutions of mineral acid salts of these N-substituted o-phenylendiamines with ferric chloride or with p-benzoquinone. Examples of phenazine derivatives suitable for reaction in the warm with arylamines are 2-amino-3-methylimino-5-methyl-3.5-dihydro - phenazine, 2 - amino - 3 - isopropylimino - 3.5-dihydrophenazine and 2-amino-3-cyclohexylimino-5-cyclohexyl-3.5-dihydrophenazine.

The following examples further illustrate the production of the new phenazine derivatives. Parts are given as parts by weight and their relationship to parts by volume is as that of grammes to millilitres. The temperatures are in degrees centigrade.

EXAMPLE 1

2 parts of 2-anilino-3-imino-5-phenyl-3.5-dihydrophenazine hydrochloride are heated in an autoclave at 80° with 45 parts by volume of isopropylamine, a pressure being attained of 4–5 atmospheres. The reaction mixture is then cooled to room temperature within 3 hours, the solid precipitate is filtered off, dissolved in benzene and the benzene solution is chromatographed on an aluminium oxide column. After concentrating and allowing to stand, 2-anilino-3-isopropylimino-5-phenyl-3.5-dihydro-phenazine crystallises from the main fraction of the eluate in the form of golden yellow needles which melt at 195–197°. When mixed with the substance produced according to Example 4 which melts at 198–199°, there is no depression of the melting point.

EXAMPLE 2

2 parts of 2-anilino-3-imino-5-phenyl-3.5-dihydrophenazine hydrochloride are refluxed with 30 parts by volume of cyclohexylamine for half an hour. The cyclohexylamine which precipitates on cooling is filtered off and petroleum ether (B.P. 40–60°) is added to the filtrate whereupon a solid orange-yellow substance precipitates. On recrystallising this from benzene, light red needles are obtained which turn brown-yellow on drying. On recrystallising again from alcohol, 2-anilino-3-cyclohexyl-imino-5-phenyl-3.5-dihydro-phenazine is obtained in the form of long, thin orange coloured needles which, after drying at 105° and 15 mm. pressure, melt at 162–165°.

EXAMPLE 3

87.2 parts of 4'-chloro-2-amino-diphenylamine are dissolved in a mixture of 440 parts by volume of 1 N-hydrochloric acid and 260 parts of water and 660 parts of acetone are added. A solution of 88 parts of technical p-benzoquinone in 2800 parts of boiling water is then added while stirring within 10 minutes, care being taken by cooling that the temperature of the deep brown-red coloured reaction mixture does not exceed 50°. Stirring is then continued for 10 minutes whereupon a dark precipitate forms and then 350 parts of 20% caustic soda lye are poured in within 15 minutes while stirring strongly at 50°. The whole is stirred for another two hours without heating, the dark brown coloured phenazine base is drawn off under suction, washed, dried and extracted with benzene in the Soxhlet apparatus. The benzene extract is purified with active charcoal and, after concentrating the liquid, 1.5 - bis - (p-chloro-phenyl)-2.2-dimethyl-2.5-dihydroimidazolo[4.5-b]phenazine is precipitated with petroleum ether. After drying, a brown powder is obtained which melts at 239–241°. After recrystallising twice from ligroin or from ligroin and acetone, the reaction product precipitates in the form of brown-yellow crystals which melt at 243–245°.

2800 parts of ethanol are poured over 28.3 parts of the 1.5-bis-(p-chloro-phenyl) - 2.2 - dimethyl-2.5-dihydro-imidazolo [4.5-b]phenazine obtained above and the whole is shaken at room temperature in a hydrogen atmosphere, according to Adams, with 0.6 part of platinum oxide. The hydrogen is taken up very quickly, particularly at the beginning. After a few hours 2.2–2.4 mols $H_2$ have been taken up and the colour which was red at the beginning has changed to golden yellow. During the hydrogenation, often a yellow crystalline substance precipitates but this is dissolved again on more hydrogen being taken up.

Stirring is then discontinued and the reaction mixture is left to itself for about 12 hours in a hydrogen atmosphere.

The catalyst is then filtered off whereupon reoxidation occurs immediately on the entry of air and the liquid becomes deep brown red. To complete the oxidation, it is left open for 6 hours at room temperature, air being introduced for a short time if necessary. Brown-red crystals separate out; the amount thereof increases on cooling with a mixture of ice/sodium chloride for 12 hours.

2-(p-chloro-anilino) - 3 - isopropylamino - 5 - phenyl-3.5-dihydrophenazine obtained after filtering and drying melts at 211–213°.

EXAMPLE 4

4 parts of 2-amino-diphenylamine hydrochloride (N-phenyl-o-phenylendiamine hydrochloride are dissolved in 60 parts by volume of 50% aqueous acetone and a hot solution of 4 parts of p-benzoquinone in 150 parts by volume of water is added. After leaving to stand for 10 minutes, the solution is made alkaline with 10% caustic soda lye. The precipitated substance is filtered off, dried and extracted with benzene. The benzene solution is adsorbed on an aluminum oxide column in which the main product moves quickly downwards as an orange-yellow band. After concentrating the eluted benzene solution which fluoresces green and allowing it to stand, 1.5-diphenyl-2.2-dimethyl - 2.5 - dihydroimidazolo[4.5-b]phenazine can be obtained by filtering off. After drying it is a yellow powder which melts at 230–232°. It is converted into 2-anilino-3-isopropylimino-5-phenyl - 3.5 - dihydrophenazine (M.P. 198–199°) in a manner analogous to that described in Example 3.

EXAMPLE 5

1 part of 2-anilino - 3 - imino - 5 - phenyl - 3.5-dihydro-phenazine is dissolved in 50 parts by volume of acetone and then 10 parts by volume of phosphoric acid are added. The mixture is heated in a water bath for 10 minutes, then diluted with water and made alkaline by the addition of 10% caustic soda lye. The substance which precipitates is filtered off, washed with water, dried and then extracted with benzene. The benzene extract is worked up in a manner analogous to Example 2. An orange-yellow powder is obtained which melts at 229–231°. There is no depression of the melting point when it is mixed with the substance according to Example 4. It is converted into the end product named in Example 4 in a manner analogous to that described in Example 3.

In the following Table I, the melting points of a number of other dihydro-imidazolo-phenazines of the Formula V and the end products obtained therefrom analogously to Examples 3–5 of Formula I are given.

*Table I*

| No. | $R_1=R_3$ | $R_2$ | M.P. intermediate Product, degrees | M.P. end Product, degrees |
|---|---|---|---|---|
| 1 | —⌬ | —CH(C$_2$H$_5$)$_2$ | 216–218 | 167–168 |
| 2 | —⌬ | —CH(CH$_3$)(CH$_2$—CH(CH$_3$)$_2$) | 182–183 | 164 |
| 3 | —⌬—CH$_3$ | —CH(CH$_3$)$_2$ | 211–213 | 202–204 |
| 4 | —⌬ | —CH(CH$_3$)(C$_2$H$_5$) | 173–176 | 174 |
| 5 | —⌬—Cl | —CH(CH$_2$—CH$_2$)$_2$ (cyclopentyl) | 299–301 | 248–250 |
| 6 | —⌬—O—CH(CH$_3$)$_2$ | —CH(CH$_2$—CH$_2$)$_2$ (cyclopentyl) | 289–291 | 200 |
| 7 | —⌬ (OCH$_3$) | —CH(CH$_2$—CH$_2$)$_2$ (cyclopentyl) | ---------- | 194–196 |
| 8 | —⌬ | —CH(CH$_2$—CH$_2$)(CH—CH$_3$) (methylcyclopentyl) | ---------- | 175–177 |
| 9 | —⌬—Cl | —CH(CH$_2$—CH$_2$)(CH—CH$_3$) (methylcyclopentyl) | ---------- | 237–239 |

Table I—Continued

| No. | R₁=R₂ | R₃ | M.P. intermediate Product, degrees | M.P. end Product, degrees |
|---|---|---|---|---|
| 10 | —⌬ | —CH(CH₂—CH(CH₃)CH₂—CH(CH₃))CH₃ (cyclic, with two CH₃ groups) | ........ | 202–204 |
| 11 | —⌬—Cl | —CH(CH₂—CH(CH₃)CH₂—CH(CH₃))CH₃ | ........ | 218–220 |
| 12 | —⌬ | —CH(CH₂—CH₂—CH₂, CH₂—CH₂—CH₂) | ........ | 191–192 |
| 13 | —⌬—Cl | —CH(CH₂—CH₂—CH₃, CH₂—CH₂—CH₃) | ........ | 234 |

EXAMPLE 6

A mixture of 20 parts of hydrochloride of 2-anilino-3-imino-5-phenyl-3.5-dihydro-phenazine and 80 parts of n-dodecylamine are heated while stirring for 30 minutes at 130–140°. After cooling the reaction mixture, 150 parts by volume of ether and 150 parts by volume of petroleum ether are added. The orange coloured undissolved part contains, apart from the reaction product, the hydrochloride of the dodecylamine. It is filtered off, the residue is dried in the air and recrystallised from 400 parts by volume of methanol. 2-anilino-3-n-dodecyl-imino-5-phenyl-3.5-dihydro-phenazine crystallises in orange coloured leaves which melt at 99–101°.

EXAMPLE 7

A mixture of 23 parts of the hydrochloride of 2-(p-chloroanilino)-3-imino - 5 - (p - chloro - phenyl) - 3.5-dihydro-phenazine and 80 parts of n-dodecylamine are heated while stirring for 30 minutes at 130–140°. After cooling the reaction mixture, 150 parts by volume of ether and 100 parts by volume of petroleum ether are added. In this case, only the hydrochloride of the dodecylamine remains undissolved. It is filtered off, the filtrate is stirred with 500 parts of water, the mixture is made acid to congo red paper with hydrochloric acid, then about 2000 parts by volume of ether are added and the whole is left to stand until the phases have separated. There is a dark coloured substance chiefly in the aqueous phase. This is filtered off, washed with ether and dried. It is the hydrochloride of 2-(p-chloro - anilino) - 3 - n - dodecylimino - 5 - (p' - chloro - phenyl) - 3.5 - dihydro-phenazine and it melts at 182–183°. In spite of the congo acid reaction of the aqueous phase, the excess n-dodecylamine is in the organic phase and can be regained by distilling off the solvent.

The above hydrochloride is converted into the free base by dispersing it, while stirring, in a mixture of 250 parts of water and 150 parts by volume of alcohol. 30 parts by volume of concentrated aqueous ammonia solution are added dropwise to the dispersion while stirring at 60–65° and the whole is stirred for another hour at the same temperature. After cooling, the precipitated base is drawn off under suction, washed with water and dried. It melts at 90–93°.

In Table II end products of the Formula I with their melting points are given which are obtained analogously to Examples 1, 2, 6 and 7 from the corresponding starting materials of Formula II and arylamines.

Table II

| No. | R₁=R₃ | R₂ | M.P., degrees |
|---|---|---|---|
| 1 | —⌬ | —C₃H₇ | 182–183 |
| 2 | —⌬ | n—C₇H₁₅ | 130–131 |
| 3 | —⌬ | —CH₂—CH₂—CH(CH₃)—CH₂—C(CH₃)₃ | 131–133 |
| 4 | —⌬ | n—C₁₀H₂₁ | 92–94 |
| 5 | —⌬ | n—C₁₂H₂₅ | 95–96 |

EXAMPLE 8

22 parts of brenzcatechin and 37.2 parts of aniline are dissolved in 900 parts by volume of alcohol and a solution of 40 parts of sodium iodate in 900 parts of water is poured in at 20–25° while stirring, the addition being completed within 25 minutes. After stirring for 6 hours at room temperature, the precipitated red reaction product is filtered off under suction, washed with 1500 parts of water and three times with 50 parts by volume of methanol each time. The 4.5-dianilino-1.2-benzoquinone so obtained melts at 185–190°. It is of sufficient purity for the next step.

21.8 parts of this product and 19.1 parts of N-cyclohexyl-o-phenylendiamine hydrochloride are suspended in 1600 parts by volume of hot alcohol and the mixture is refluxed for 6 hours. It is then cooled to 65–70°, 30 parts of concentrated ammonia are added within half an hour and the whole is stirred for a further hour at the same temperature. After cooling, the crude condensation product is filtered off under suction, washed with 500 parts by volume of water, dried and recrystallised from a mixture of benzene and petroleum ether. 2-anilino-3-phenylimino-5-cyclohexyl-3.5-dihydro-phenazine is obtained which melts at 185–186°.

On using 51 parts of p-chloroaniline instead of the aniline in the first step, 2-(p-chlor-anilino)-3-(p'-chlorophenylimino)-5-cyclohexyl-3.5-dihydro-phenazine is obtained in an analogous manner. M.P. 198°.

The new phenazine derivatives according to the present invention can be used for the peroral treatment of tuberculous diseases in doses of about 1–3 mg. per kg. weight of the patent. Particularly advantageous is the combination of such phenazine derivatives with other tuberculostatics which are administered per os for the purpose of preventing or retarding the development of tubercle strains which are resistant to medicaments and the relapses caused thereby. Such combinations can contain for example 15 mg. of 2-(p-chlor-anilino)-3-isopropylimino-5-(p'-chloro-phenyl)-3.5-dihydro - phenazine and 45 mg. of isonicotinic acid hydrazides per tablet or dragée. About 6–8 of such tablets are administered to adults daily which corresponds to one tables per 10 kg. body weight.

What we claim is:

1. Phenazine derivatives of the formula:

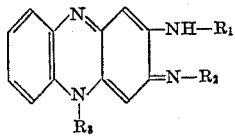

wherein two of the symbols $R_1$, $R_2$ and $R_3$ represent the same aryl radicals selected from the group consisting of phenyl, chlorophenyl, lower alkylphenyl and lower alkoxyphenyl, and the third symbol represents a radical selected from the group consisting of

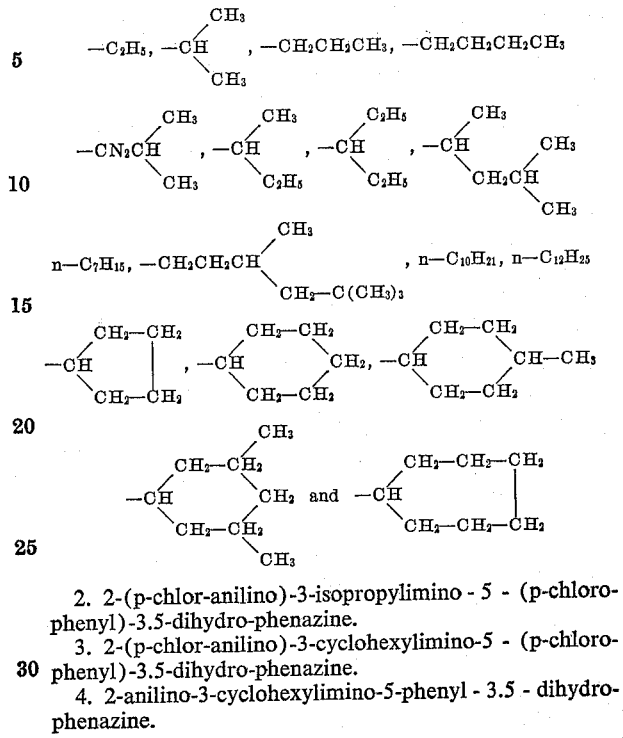

2. 2-(p-chlor-anilino)-3-isopropylimino - 5 - (p-chlorophenyl)-3.5-dihydro-phenazine.

3. 2-(p-chlor-anilino)-3-cyclohexylimino-5 - (p-chlorophenyl)-3.5-dihydro-phenazine.

4. 2-anilino-3-cyclohexylimino-5-phenyl - 3.5 - dihydro-phenazine.

References Cited in the file of this patent

Chemical Reviews, vol. 35, p. 389 (1944).
Chemical Abstracts, vol. 48, p. 1378 (1954).